United States Patent [19]
Fulmer

[11] 3,806,200
[45] Apr. 23, 1974

[54] BRAKE PROPORTIONING VALVE WITH BLEND BACK

[75] Inventor: Keith H. Fulmer, South Bend, Ind.

[73] Assignee: The Bendix Corporation, South Bend, Ind.

[22] Filed: Jan. 16, 1973

[21] Appl. No.: 324,032

[52] U.S. Cl. .................... 303/6 C, 188/349
[51] Int. Cl. ............................. B60t 11/34
[58] Field of Search ............... 303/6, 84 A, 84 R; 188/349, 151 A, 151 R, 152; 340/52 C; 200/82 D

[56] References Cited
UNITED STATES PATENTS
| | | | |
|---|---|---|---|
| 3,492,052 | 1/1970 | Klimek | 303/6 C |
| 3,482,884 | 12/1969 | Kersting | 303/6 C |
| 3,669,504 | 6/1972 | Stokes | 303/6 C |

*Primary Examiner*—Duane A. Reger
*Assistant Examiner*—D. C. Butler
*Attorney, Agent, or Firm*—Leo H. McCormick, Jr.; William N. Antonis

[57] ABSTRACT

A proportioning valve for a vehicle hydraulic braking system. The valve includes a housing having an inlet port, an outlet port, and a bore communicating the inlet port with the outlet port. Valve means are disposed within the bore, dividing the bore into an inlet chamber which is communicated with one line of the vehicle's dual master cylinder via the inlet port, and an outlet chamber which is communicated with the rear wheel brakes of the vehicle through the outlet port. The valve means includes first and second valve members independently slidable in the bore from a spring biased open position in which uninterrupted fluid communication is established between the inlet and outlet chambers during brake release. When the brakes are applied and the pressure level in the outlet chamber reaches a predetermined value, the second valve member is urged away from its biased position toward the first valve member to restrict flow between the chambers so that the pressure level in the inlet chamber rises more rapidly than the pressure level in the outlet chamber up to a predetermined pressure level in the inlet chamber. Upon reaching the predetermined inlet pressure level the first valve member is moved away from the second valve member so that the pressure level in the outlet chamber is caused to rise at a greater rate than the pressure level in the inlet chamber until the pressure levels in the inlet and outlet chambers are substantially the same, at which time the valve permits uninterrupted flow, thereby blending together the pressure levels of the inlet and outlet chambers.

9 Claims, 2 Drawing Figures

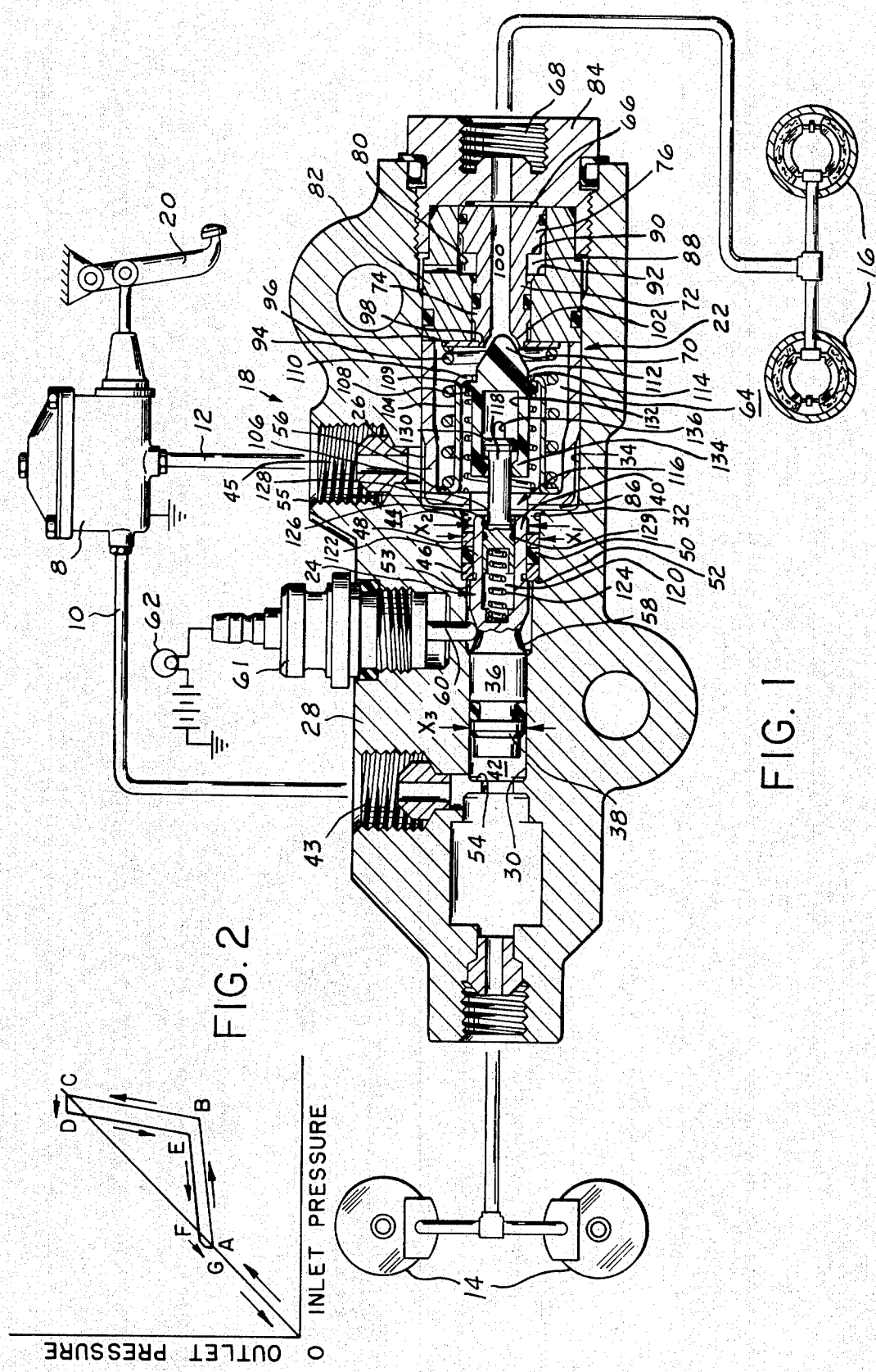

BRAKE PROPORTIONING VALVE WITH BLEND BACK

BACKGROUND OF THE INVENTION

This invention relates to a proportioning valve for use in a vehicle hydraulic braking system for controlling the braking force relationship between the front and rear brakes.

The brake art is replete with proposals intended to compensate for the erratic braking of a vehicle caused by the weight shift from the rear wheels to the front wheels when decelerated. The weight shift being caused by the vehicle tending to rotate about its center of mass when braked. Since larger braking forces can be applied to the front wheel brakes, because of the greater weight on the front axle, larger brakes have been suggested for the front wheels. This, of course, improved front end braking but did not help wheel "lock-up," a condition or phenomenon occurring at the rear wheels during normal braking, caused by the vehicle shifting its weight to the front wheels. This weight shift reduces the tractional forces between the rear tires and road surface, minimizing effective braking. Moreover, the adoption of the disc brake for the front wheels aggravated the "lock-up" problem because of the higher pressures required for disc brakes and actually motivated use of proportioning valves in the hydraulic lines to the rear wheel brakes for controlling brake applying pressures. However, the early types of prior art proportioning valves continuously proportion the braking force on the rear wheels notwithstanding the occurrence of brake "fade," a condition well known in the brake art caused by drum brake expansion due to relatively high temperatures. U.S. Pat. No. 3,360,004, owned by the assignee of the present invention, discloses one type of proportioning valve of the prior art. This proportioning action deprives the rear wheel brakes of their full braking capacity at the time of "fade" though higher master cylinder pressures are available. As a matter of fact during brake "fade" much higher braking pressures are necessary to achieve maximum braking effectiveness. This invention overcomes the deficiencies of prior art proportioning valves by utilizing maximum master cylinder pressure on the rear drum brakes during a brake "fade" condition. The proportioning valve of the invention is also shown operatively connected to a brake failure device which is actuated by fluid pressure differential between the front and rear hydraulic braking systems so that upon failure of the front braking system the proportioning effect of the valve is overruled, admitting full master cylinder pressure to the rear brakes.

SUMMARY OF THE INVENTION

A proportioning valve for the rear wheel drum brakes of a vehicle responsive to master cylinder pressure of a predetermined value to admit full master cylinder pressure to the rear wheel brakes to insure the most effective braking under adverse braking conditions.

A proportioning valve disposed in the hydraulic line to the rear wheel drum brakes of a vehicle responsive to master cylinder pressure of a predetermined value sensed at the valve inlet for rendering the proportioning effect of the valve ineffective by communicating the rear brakes with the master cylinder for substantially unrestricted fluid flow.

A proportioning valve for the rear wheel brakes that reduces the fluid pressure level supplied to the rear wheel brakes in accordance with a predetermined pressure developed at the valve outlet until a predetermined pressure level is reached at the valve inlet, at which time the proportioning valve opens to allow continuous fluid communication between the master cylinder and the rear brakes so that the fluid pressure rise at the valve outlet is more rapid than the fluid pressure rise at the valve inlet until the fluid pressure levels at the inlet and outlet are substantially the same.

DESCRIPTION OF THE DRAWINGS

FIG. 1 is a schematic representation of a vehicle braking system incorporationg a proportioning valve constructed in accordance with the teachings of my invention shown in longitudinal section; and FIG. 2 is a graphical representation of the pressure levels appearing at the inlet and outlet ports of the proportioning valve of FIG. 1 under varying master cylinder pressures.

DETAILED DESCRIPTION

Referring now to FIG. 1 of the drawing, the reference numeral 8 designates a dual system master cylinder, having separate conduits 10 and 12, connected respectively, to front disc brakes 14 and rear drum brakes 16 through a brake control mechanism 18. Fluid pressure is developed in the dual master cylinder 8 by depressing a foot operated pedal 20 positioned in the operator's compartment of the vehicle. The control mechanism 18 includes proportioning valve means 22 and a brake failure and warning device 24, located in a stepped bore 26 of a housing 28. The stepped bore 26 includes a smaller diameter portion 30, an intermediate diameter portion 32 and a larger diameter portion 34. The brake failure device 24 includes a piston or spool 36 reciprocally positioned in the smaller and intermediate portions 30 and 32 of the stepped bore 26 so that opposed ends 38 and 40 of the spool 36 are exposed respectively, to master cylinder pressure developed in chambers 42 and 44. The chambers 42 and 44 are defined in the bore 26 by the respective opposed ends 38 and 40 of the spool and the corresponding adjacent ends of the bore. The chamber 42 communicates with the front brakes 14 and with inlet port 43 to which the conduit 10 is connected. The chamber 44 is in communication with the outer conduit 12 of the dual system master cylinder via an inlet port 45. The spool end 40 is mounted in inner and outer bearing rings 46 and 48 and a seal 50, the latter of which prevents leakage from the chamber 44. The rings 46 and 48 are restrictive in movement to the left by engagement of the inner ring 46 with a shoulder 52 formed in the intermediate portion 32 of the stepped bore. The inner ring 46 likewise abuts shoulder 53 of the spool to provide an effective area $X_1$ on which fluid pressure in the chamber 44 acts, urging the spool and rings as a unit to the left against the shoulder 52. This positions the spool in its central position shown in FIG. 1. Spool movement to the left away from its central position is limited by engagement of the spool end 38 with a shoulder 54 of the smaller bore 30. In moving the spool to the left from its central position, the effective area on which fluid pressure acts is shown as $X_2$. Spool movement to the right is limited by the outer ring 48 engaging a flange 55 of member 56. Spool movement to the right is accomplished by the fluid pressure in the chamber 42 acting on an effective area represented by $X_3$ which is smaller than $X_1$ and $X_2$. With equal pressures acting on the ends 38 and 40 of the spool 36, a net axial force will be developed, due to the difference in the effective areas $X_1$ and $X_3$, urging the spool to its central position so that the ring 46 engages the shoulder 52. The spool 36 is formed with a ramp 58 on which a switch actuating pin 60 rides for closing a switch 61 which lights a light 62 in the event of a hydraulic brake failure in one of the lines 10 or 12. Brake failure warning devices are well known and since the device per se forms no part of the invention no further description is believed necessary. Reference is made to U.S. Pat. No. 3,556,607, owned by the assignee of the present invention, as showing one form of brake failure warning device of the prior art.

The valve means 22 is located in the larger diameter section 34 of the bore 26 and divides that section into inlet and outlet chambers 64 and 66, communicating respectively with the inlet port 45 and outlet port 68, the latter of which is connected to the rear wheel brakes 16. The valve means 22 includes a first valve member 70 and a second valve member 72 independently slidable within the bore with respect to each other for controlling fluid flow between the inlet and outlet chambers 64 and 66 respectively. The second valve member 72 is generally longitudinal in construction with stepped diameters 74 and 76 slidably carried in a mating stepped bore 80 of an end closure member 82 of the bore 26. The end member 82 is secured in the bore between the cup-shaped member 56 and a plug 84, the latter being threadedly secured to the outer end of the larger diameter bore 34 so as to close that end from fluid leakage. The outlet port 68 is located in the plug 84. Appropriate seals are associated with the valve member 72, end member 82 and plug 84. Cavity 88, formed in the stepped bore 80, is open to atmosphere. The inlet chamber 64 is communicated to the inlet port 45 through channels 86 formed in the flange 55 of the cup-shaped member 56. The second valve member 72 has its end of smaller effective area 74 exposed to pressure in the inlet chamber 64 and its end of larger effective area 76 exposed to pressure in the outlet chamber 66. An abutment 90 is formed on the second valve member 72 for engagement with a shoulder 92 of the end member 82 to limit movement of the second valve member to the left into the inlet chamber 64. Maximum displacement of the second valve member 72 to the right, as viewed in FIG. 1, is limited by engagement of the end 76 with the plug 84. The valve member 72 is urged to the right end of the bore away from the first valve member and against the plug 84 by resilient means 94 interposed between the flange 55 of the cup-shaped member 56 and a flat washer 96, having an opening 98 into which the smaller end 74 of the valve member 72 fits. The resilient means or spring 94 is compressed to a preselected preload which acts against the valve member 72. A longitudinal passage 100 in the valve member 72 communicates the inlet chamber 64 with the outlet chamber 66. A seat 102, formed in the end of the passage 100 where it terminates in the smaller diameter end 74 of the valve member 72, matingly engages the first valve member 70 to restrict flow. The first valve member 70 is slidably carried in a retainer sleeve 104 provided with an outwardly extending flange 106 against which the preloaded spring 94 is urged to thereby position the sleeve so as to align the first valve member 70 axially with the second valve member 72. A spring 108 yieldably urges a radial flange 109 of valve member 70 against an abutment or stop 110 of the sleeve 104. A cylindrical portion 112 of the valve member 70 projects through an opening 114 of the stop 110 to provide support for the first valve member as it slides in the sleeve 104.

Means 116 is operatively connected to the first valve member 70 for adjusting the first valve member in response to inlet chamber pressure of a predetermined level so that the pressure level in the outlet chamber rises more rapidly than the pressure level in the inlet chamber. The adjusting means 116 includes a plunger 118 reciprocally carried in an axial cavity 120 of a guide member 122 formed in the end 40 of the piston 36. Spring means 124, located in the cavity 120, urges the plunger 118 outwardly against a stop element 126 which is engaged by a shoulder 128 on the plunger. A seal 129 is suitably located on the plunger to prevent leakage from the chambers 44 and 64 into the cavity 120. One end of the plunger 118 projects into the inlet chamber 64 and is provided with an enlarged head portion 120 received in an axial passage 132 of the first valve member 70 for engagement with a neck portion 134 of the valve member 70 when the plunger is moved to the left, as viewed in FIG. 1, under the influence of inlet chamber pressure of a predetermined level. Slots 136 in the first valve member 70, only one slot being shown, insure exposure of the plunger head 130 to inlet chamber pressure. It is to be noted that the spring rate of the spring 124 is so selected that it has a lower rate than the spring 94 which is preloaded against the washer 96 urging the second valve member 72 to its position of FIG. 1. The higher rate of the spring 94 acting on the second valve member 72 will allow the first valve member 70, on which the spring 124 of lower rate acts, to move faster than the second valve member in response to a predetermined pressure level in the inlet so that the first valve member remains unseated from the second valve member to insure that the rise im pressure in the outlet is more rapid than that in the inlet chamber up to a given pressure level.

MODE OF OPERATION

Referring to FIG. 1, the components of the brake control mechanism 18 are shown in the position they occupy during brake release. Depressing brake pedal 20 develops hydraulic fluid pressure in the master cylinder 8 which is communicated to the inlet ports 43 and 45 connected respectively, to the front brakes 14 and the rear brakes 16. Fluid enters the inlet port 45, flows through the inlet chamber 64, the passage 100, the outlet chamber 66 and through the outlet port 68 to the rear wheel brakes. At the outset the fluid pressure in the inlet chamber 64 equals the pressure in the outlet chamber 66. This pressure level is shown on the pressure graph of FIG. 2 as OA. Since this equal pressure acts on the unequal area ends 74 and 76, there is a net force unbalance acting on the second valve member 72 tending to urge it to the left against the spring 94, as viewed in FIG. 1. When the pressure developed in the chambers 64 and 66 reaches a predetermined value, such that the net force unbalance exceeds the force of the spring 94, the second valve member 72 will move to the left until the seat 102 engages the first valve member 70, shutting off communication between the inlet and outlet chambers 64 and 66. This is point A on FIG. 2, and is actually the point at which proportioning of pressures between the front and rear brakes starts.

With the members 70 and 72 of the valve closed, any further increase in pressure in the inlet chamber 64 will act only on the smaller end 74 of the second valve member. Therefore, to reopen the valve, the pressure rise in the inlet chamber must be such as to overcome the closing pressure acting on the larger area end 76. When the inlet chamber pressure rise is sufficient to separate or reopen the valve members, fluid under pressure is admitted to the outlet chamber 66. Since the larger effective area end 76 is exposed to the outlet chamber pressure, the fluid pressure rise in the outlet chamber upon reopening of the valve is only a fraction of the rise in pressure in the inlet chamber before the valve recloses. This valve action of opening and closing between the valve members 70 and 72 starts at point A on FIG. 2 when the outlet chamber pressure reaches a predetermined value A and continues along line A to B. That is, the opening and closing between the valve members continues as the pressure level rises in the inlet chamber 64, maintaining the pressure levels in the chambers 64 and 66 in the ratio of the effective areas of the ends 74 and 76, with the pressure level in the outlet chamber 66 always less, up to point B on the curve of FIG. 2.

When the pressure in the inlet chamber 64 reaches a predetermined pressure level, such as point B on the graph of FIG. 2, the plunger 118, on which the inlet chamber pressure acts, is moved to the left, overcoming the spring 124, so that the enlarged head 130 engages the neck portion 134 of the valve member 70, unseating the latter from the valve member 72. This separation between the valve members is maintained as the pressure level in the inlet chamber 64 continues to rise but now at a rate less than the pressure level of the outlet chamber 66. That is, as the inlet chamber pressure level increases from point B, it acts on the plunger 118 causing further separation between the valve members 70 and 72, thus causing the fluid pressure level in the outlet chamber 66 to rise more rapidly than the fluid pressure level in the inlet chamber up to a point C on the curve of FIG. 2, at which the pressures in the two chambers are equal. The plunger 118 has now fully withdrawn the valve member 70 from the seat 102 of the valve member 72, permitting uninterrupted flow between the chambers 64 and 66 and the rear brakes 16. Any further pressure increase beyond point C will cause the pressure levels in the chambers 64 and 66 to rise at about the same rate, since the valve is open, i.e., the plunger has established maximum separation between the valve members.

Release of the brake pedal 20 will theoretically cause the rear brake system pressure to follow the curve C to O shown in FIG. 2, allowing for hysteresis losses, etc., of the component parts of the valve means 22. The line CD represents initial brake pedal release which permits the first valve member 70 to adjust toward the seat 102 as the inlet chamber pressure declines along the line to point D, creating a pressure differential in the chambers 64 and 66. The valve members 70 and 72 now adjust with respect to one another in metering fluid flow between the chambers 64 and 66 under the influence of the spring loaded plunger 118 and the spring loaded valve member 72, so as to cause the pressure level in the outlet chamber 66 to decrease faster than the pressure level in the inlet chamber 64. During this metering action between the valve members, the pressure levels in the two chambers change back and forth as indicated on the graph from D to E until finally at E the plunger 118 has moved to the right so that the shoulder 128 now engages the abutment 126, withdrawing plunger head portion 130 from the neck portion 134 of the first valve member. The first valve member 70 is now urged toward the right by the spring 108 without interference from the plunger head 130. As inlet chamber pressure is further reduced, from point E of FIG. 2, the second valve member 72 closes against the first valve member 70 and the two members shift to the left as a unit, expanding the volume of the chamber 66 and accordingly reducing the pressure level in the outlet chamber, as indicated on the line EF of FIG. 2. Because of the relationship of the effective areas of the second valve member ends 74 and 76 to the respective chambers 64 and 66 and the preload on the spring 94, it will be observed that the fluid flow is metered so that the decline in pressure level from E to F, as shown in FIG. 2, is at a greater rate in the inlet chamber 64 than in the outlet chamber 66. Further pressure reduction in the inlet chamber 64 causes a further decay in the pressure level of the chamber 66, resulting in the pressure levels of the two chambers 64 and 66 diminishing along the line F to G to O.

The dual system master cylinder 8 develops equal pressures in the inlet ports 43 and 45 of the brake control mechanism during a brake application. This equal pressure acts in the inlet chambers 42 and 44 to which the ends 38 and 40 respectively, of the spool 36 are exposed. The maximum effective area on which the pressure level in the chamber 44 acts tending to urge the spool 36 to the left is designated as $X_1$. The effective area on which the pressure level in the chamber 42 acts tending to urge the spool 36 to the right is designated as $X_3$, which effective area is less than $X_1$. As previously described, the effective area designated by $X_1$ is effective only in urging the spool to the left to its central position occupied in FIG. 1, since the ring 46 engages the shoulder 52. That is, with balanced pressure levels in the inlet ports 43 and 45, the spool 36 is centered as shown in FIG. 1, since the greater effective area $X_1$ is acted upon by the pressure level in the chamber 44, positioning the ring 46 against the shoulder 52 of the bore 32 and the shoulder 53 of the spool. Also since $X_3$ is larger than $X_2$, the spool 36 is urged to the right against the ring 46 during pressure balance in the chambers 42 and 44.

In the event of a failure in the hydraulic system of the front wheel brakes 14, the pressure level in the chamber 42, in communication with the inlet 43, would drop. The higher pressure level acting in the chamber 44 and on the effective area $X_2$ drives the spool 36 to the left, as viewed in FIG. 1, pulling the plunger 118 along so that the head 130 contacts the neck portion 134 of the first valve member 70, withdrawing the latter to the left to prevent engagement with the seat 102 as the second valve member 72 shifts to the left. This action of the plunger on the valve member 70 inhibits proportioning of the fluid pressure by the valve means 22 to the rear brakes and connects the latter to the master cylinder 8 for maximum braking. Shifting the spool 36 to the left also causes the switch actuating pin 60 to ride upon the spool, thus lighting the warning light 62 which calls attention to the brake failure. Upon repairing the system, the first brake application will force the spool 36 to recenter in its normal position, as shown in FIG. 1. Recentering is accomplished by pressure being applied against the end 38 of the spool having an effective area $X_3$ which is larger than the spool end 40 having an effective area $X_2$.

I claim:

1. A control mechanism for vehicle hydraulic brakes, which comprises:

a housing having a stepped bore therein;

valve means in the bore dividing the bore into inlet and outlet chambers adapted to be connected respectively, to a master cylinder and to vehicle brakes;

said valve means including first and second valve members co-axially positioned in the bore and independently movable therein toward and away from each other for controlling fluid flow between the chambers;

a stop for the first valve member and a spring urging the first valve member against the stop;

said second valve member having opposed ends exposed respectively to the inlet and outlet chamber pressures and a longitudinal passage connecting the opposed ends, said end which is exposed to the inlet chamber pressure being of smaller effective area than said end exposed to the outlet chamber pressure;

said end of smaller effective area having a seat therein circumscribing the passage and on which the first valve member seats;

spring means acting on the end of the smaller effective area urging the second valve member away from the first valve member to establish fluid communication between the inlet and the outlet chambers; and adjusting means operatively connected to the first valve member for moving the first valve member away from the seat of the second valve member;

said second valve member being responsive to a predetermined pressure at the outlet chamber urging the second valve member toward the first valve member to control flow between the chambers so that the pressure in the inlet chamber rises more rapidly than the pressure in the outlet chamber;

said adjusting means being responsive to a predetermined pressure at the inlet chamber for moving the first valve member away from the seat of said second valve member so that the pressure in the outlet chamber rises more rapidly than the pressure in the inlet chamber, thereby blending the inlet chamber pressure with the outlet chamber pressure.

2. In a brake control mechanism for use in a vehicle hydraulic system:

a housing having an inlet port, an outlet port and a bore connecting the inlet port with the outlet port;

valve means in the bore dividing the bore into an inlet chamber and an outlet chamber, said inlet and outlet chambers communicating respectively, with the inlet and outlet ports;

said valve means including first and second valve members independently slidable within the bore in response to predetermined pressures in the inlet and outlet chambers for controlling fluid flow between the chambers;

resilient means for urging the second valve member away from the first valve member to establish communication between the chambers;

said second valve member being constructed and arranged to respond to a predetermined pressure at the outlet chamber urging the second valve member toward the first valve member to restrict flow between the chambers so that the pressure level in the inlet chamber rises more rapidly than the pressure level in the outlet chamber;

means for adjusting the first valve member so that the pressure level at the outlet chamber rises more rapidly than the pressure level in the inlet chamber, said adjusting means operatively connected to the first valve member and responsive to a predetermined inlet chamber pressure;

said second valve member having a longitudinal passage communicating the inlet and outlet chambers and a larger effective area at one end exposed to the outlet chamber pressure and a smaller effective area at the other end exposed to the inlet chamber pressure, said second valve member and said first valve member cooperating to regulate flow between the chambers via the passage; and said second valve member having a seat in the passage at the end having the smaller effective area which is matingly contiguous the first valve member for engagement therewith in regulating flow.

3. The invention of claim 2:

and a brake failure device hydraulically connected to front and rear brakes and mechanically linked to the first valve member through the adjusting means for moving the first valve member away from the second valve member upon failure of hydraulic pressure in the front brakes so that the rear brakes are connected to inlet chamber pressure.

4. The invention of claim 3:

said brake failure device including a spool slidably carried in the bore and having opposed ends exposed respectively to the front and rear brake pressures, said spool mounting said adjusting means.

5. The invention of claim 2:

abutment means against which the first valve member is urged; and means for yieldably urging the first valve member against said abutment means.

6. The invention of claim 5:

said adjusting means including a pressure responsive plunger having one end exposed to inlet chamber pressure and adapted for engagement with the first valve member so as to withdraw the first valve member away from the second valve member upon the inlet chamber pressure reaching a predetermined value and further including a guide member having a cavity in which the other end of the plunger is reciprocally received, and spring means located in the cavity yieldably opposing movement of the plunger in respnse to inlet chamber pressure.

7. The invention of claim 6:

said resilient means which urges the second valve member away from the first valve member being a spring the rate of which is higher than the rate of said spring means opposing movement of the plunger so that the first valve member is moved away from the second valve member in response to the predetermined pressure at the inlet chamber to thereby blend the pressures between the inlet and outlet chambers.

8. The invention of claim 7:
said first valve member having an axial passage therein and a neck portion in one end of the passage;
said plunger having its one end slidably received in the axial passage and also having an enlarged head on said one end for engaging said neck portion upon movement of the plunger in response to the inlet chamber pressure of said predetermined value.

9. The invention of claim 8:
said plunger having a shoulder on that end which is slidably received in the cavity of said guide member, and a stop element located in the cavity for engagement with the shoulder of said plunger under the influence of said spring means so that the plunger head is positioned a given distance from the neck portion of the first valve member to allow seating and unseating between the first and second valve members until said inlet pressure attains a predetermined value.

* * * * *